(12) United States Patent
Palmer et al.

(10) Patent No.: US 10,823,650 B2
(45) Date of Patent: Nov. 3, 2020

(54) DIRECT THERMAL INJECTION THERMAL ANALYSIS

(71) Applicant: TA Instruments-Waters L.L.C., Milford, MA (US)

(72) Inventors: Phillip Palmer, Hockessin, DE (US); Silviu Apostolescu, Ridley Park, PA (US); Krunoslav Esteban Draganovic, Newark, DE (US); Donald J. Mahnken, Wrightsville, PA (US); Vaishali Parikh, Newark, DE (US)

(73) Assignee: TA INSTRUMENTS —WATERS LLC, Milford, MA (US)

( * ) Notice: Subject to any disclaimer, the term of this patent is extended or adjusted under 35 U.S.C. 154(b) by 302 days.

(21) Appl. No.: 15/818,441

(22) Filed: Nov. 20, 2017

(65) Prior Publication Data

US 2018/0143118 A1  May 24, 2018

Related U.S. Application Data

(60) Provisional application No. 62/425,169, filed on Nov. 22, 2016.

(51) Int. Cl.
*G01N 1/44* (2006.01)
*G01N 5/04* (2006.01)
*G01N 25/20* (2006.01)
*G01N 25/48* (2006.01)
*G01K 7/02* (2006.01)

(52) U.S. Cl.
CPC .............. *G01N 1/44* (2013.01); *G01N 5/04* (2013.01); *G01N 25/20* (2013.01); *G01N 25/4806* (2013.01); *G01N 25/4813* (2013.01); *G01N 25/4846* (2013.01); *G01N 25/4866* (2013.01); *G01K 7/02* (2013.01)

(58) Field of Classification Search
CPC ...... G01N 5/04; G01N 25/20; G01N 25/4806; G01N 25/4813; G01N 1/44; G01N 25/4846; G01N 25/4866; G01K 7/02
See application file for complete search history.

(56) References Cited

U.S. PATENT DOCUMENTS 3,195,343 A * 7/1965 Ference ................... G01G 7/02
                                                    374/14
4,304,118 A * 12/1981 Bartha ...................... G01N 5/00
                                                    374/11
6,370,955 B1 * 4/2002 Tuller ..................... C23C 14/546
                                                    204/298.03

(Continued)

FOREIGN PATENT DOCUMENTS

EP    2942612 A1    11/2015
GB    2278202 A     11/1994

(Continued)

OTHER PUBLICATIONS

Van Humbeek. "Simultaneous Thermal Analysis." Handbook of Thermal Analysis and Calorimetry, vol. 1: Principles and Practice. Amsterdam: Elsevier. (1998): 497-508.

*Primary Examiner* — Nathaniel T Woodward
*Assistant Examiner* — Philip L Cotey
(74) *Attorney, Agent, or Firm* — Womble Bond Dickinson (US) LLP; Deborah M. Vernon; Heath T. Misley

(57) ABSTRACT

The present disclosure relates generally to thermal analyses having direct application of thermal energy to a sample.

15 Claims, 10 Drawing Sheets

(56) References Cited

U.S. PATENT DOCUMENTS

| | | | | |
|---|---|---|---|---|
| 6,660,228 B1* | 12/2003 | Chang | B01J 19/0093 | 356/246 |
| 7,273,316 B2* | 9/2007 | Monceau | G01N 5/04 | 374/14 |
| 8,395,770 B1* | 3/2013 | Hug | G01N 21/65 | 356/317 |
| 8,408,051 B2* | 4/2013 | Bourg, Jr. | G01N 15/0205 | 73/73 |
| 9,568,418 B1* | 2/2017 | Hug | G01N 21/645 | |
| 9,816,907 B2* | 11/2017 | Schawe | G01G 7/00 | |
| 2003/0197125 A1* | 10/2003 | De Saro | G01N 33/205 | 250/339.07 |
| 2004/0133084 A1* | 7/2004 | Rule | G01N 21/03 | 600/310 |
| 2004/0141541 A1* | 7/2004 | Williams | G01N 5/04 | 374/14 |
| 2006/0120431 A1* | 6/2006 | Monceau | G01N 5/04 | 374/14 |
| 2006/0140246 A1* | 6/2006 | Danley | G01G 19/52 | 374/14 |
| 2008/0144694 A1* | 6/2008 | Danley | G01G 19/52 | 374/14 |
| 2011/0283705 A1* | 11/2011 | Oliver | F42D 3/00 | 60/698 |
| 2012/0309101 A1* | 12/2012 | Horn | G01N 21/8507 | 436/164 |
| 2013/0008870 A1* | 1/2013 | Nogami | H01L 21/02087 | 216/55 |
| 2013/0336355 A1* | 12/2013 | Neumann | G01N 25/20 | 374/10 |
| 2015/0153292 A1* | 6/2015 | Nishimura | G01N 5/00 | 374/12 |
| 2016/0054181 A1* | 2/2016 | Shinoda | G01K 7/02 | 374/142 |
| 2017/0276538 A1* | 9/2017 | Yamada | G01G 9/00 | |
| 2018/0080888 A1* | 3/2018 | Nazarian | G01N 25/22 | |

FOREIGN PATENT DOCUMENTS

| | | |
|---|---|---|
| JP | S62123344 A | 6/1987 |
| WO | 2011065970 A1 | 6/2011 |

* cited by examiner

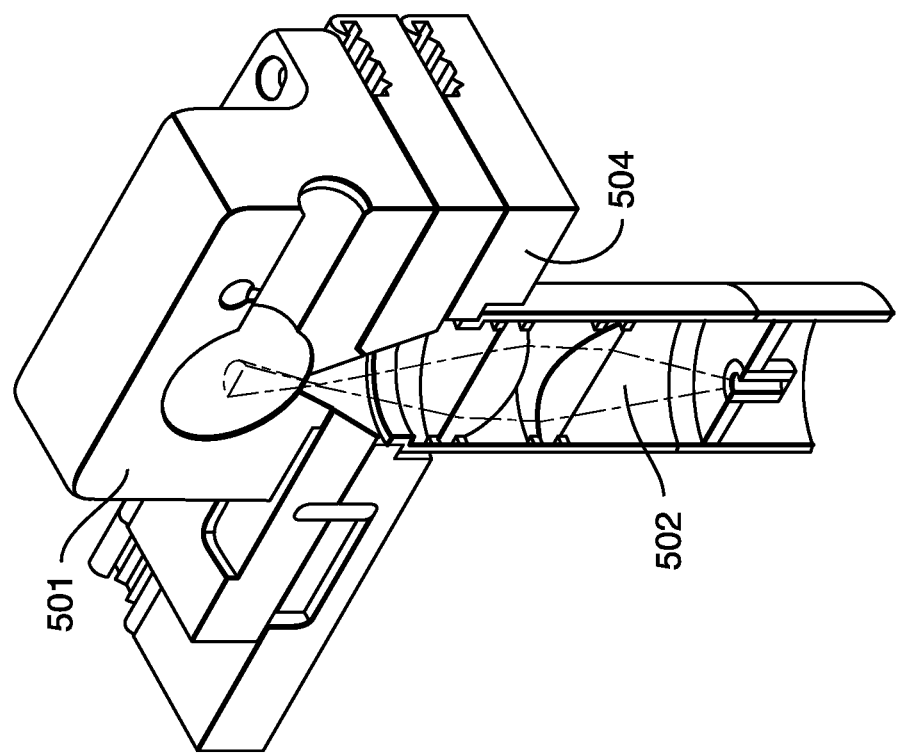
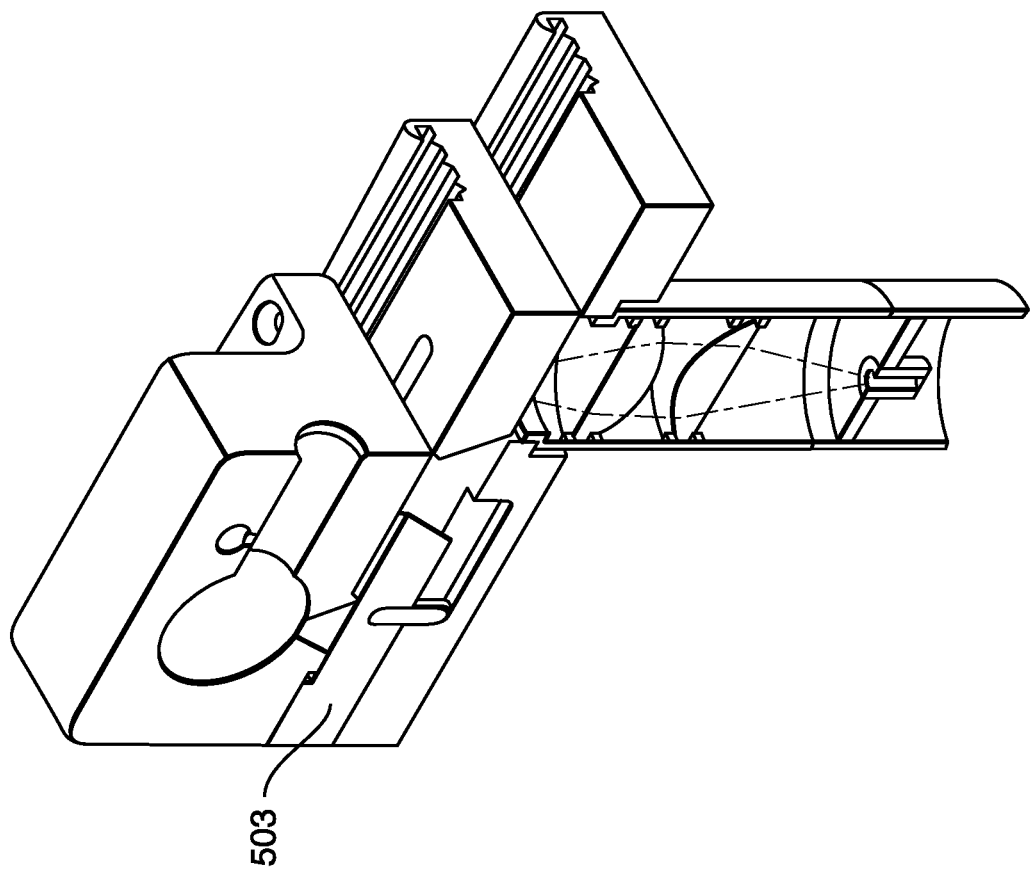
FIG. 5A
FIG. 5B

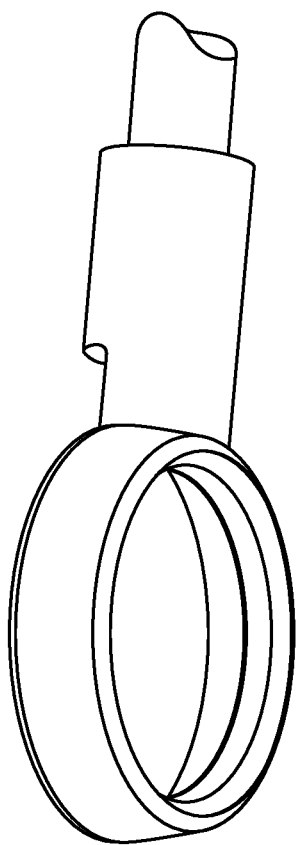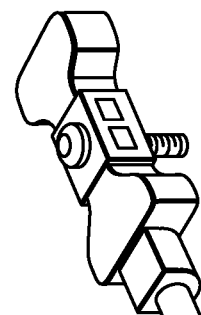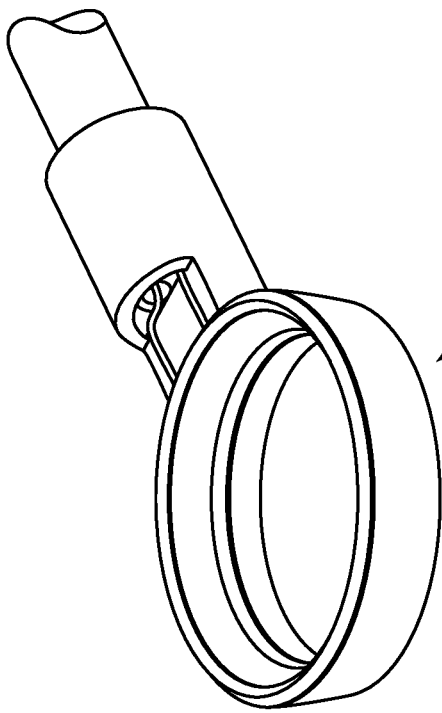

DIRECT THERMAL INJECTION THERMAL ANALYSIS

RELATED APPLICATIONS

This application claims the benefit of U.S. Provisional Patent Application Ser. No. 62/425,169 titled "Direct Thermal Injection Thermal Analysis" filed on Nov. 22, 2016, the contents of which is herein incorporated by reference in its entirety.

TECHNICAL FIELD

The present disclosure relates generally to thermal analyses having direct application of thermal energy in the form of electromagnetic radiation (e.g., light) to a sample.

BACKGROUND OF THE INVENTION

The field of thermal analysis is a branch of materials science where the properties of materials are studied as they change with temperature. Two of the more common thermal analysis methods are thermogravimetric analysis (TGA) and differential scanning calorimetry (DSC). TGA measures the amount and rate of change in the mass of a sample as a function of temperature and time in a controlled atmosphere. DSC measures the difference in the amount of heat required to increase the temperature of a sample and reference as a function of temperature. In DSC, both the sample and reference are maintained at very nearly the same temperature throughout the experiment.

Traditionally, heating of the sample (or sample and reference) in thermal analysis instruments is indirect. It can involve the use of a relatively large furnace and/or heating unit and large amounts of energy. The heat energy is supplied by one or more heating elements, such as lamps or electrical conductors. Traditional instruments are slow to heat and cool, require a lot of energy to change sample temperature, and require regular routine maintenance and replacement.

The present disclosure relates to thermal analyses having direct application of thermal energy in the form of electromagnetic radiation to the sample. The direct application of electromagnetic radiation allows for a fast, dynamic and economical analysis.

SUMMARY OF THE INVENTION

The present disclosure relates generally to thermal analyses having direct application of thermal energy to a sample.

In one embodiment, the present disclosure relates to an apparatus for thermal analysis including a balance, a vessel having a surface, wherein the surface is reflective, an electromagnetic radiation source capable of delivering electromagnetic radiation to the vessel and a sample beam having a proximate end and a distal end, wherein the proximate end is connected to the balance and the distal end extends into the vessel, the distal end having a thermocouple and adapted to hold a sample.

In another embodiment, the present disclosure relates to a method of heating a sample in an apparatus for thermal analysis, including irradiating the sample with electromagnetic radiation, and measuring a thermal property of the irradiated sample.

The methods and apparatus of the present disclosure provide several advantages over the prior art. The direct application of thermal energy in the form of electromagnetic radiation allows for fast, dynamic and economical analyses. Delivery of electromagnetic radiation to a sample, such as by a laser, provided the ability to deliver energy into a material to effect a temperature change rapidly and controllably.

The methods and apparatus of the present disclosure can utilize highly focused electromagnetic radiation energy in techniques common to commercially viable benchtop instruments, such as a thermal gravimetric analyzer instrument. The use of a laser source in conjunction with a containment vessel can permit not only the elevation of sample temperatures in a controllable manner, but do so under controlled atmospheric/environmental conditions. The use of direct application of electromagnetic radiation also allows for a reduction in overall instrument cost of goods sold by elimination of costly high temperature furnaces, support electronics, and heat exchangers. The reduced power consumption and direct heating of the sample also eliminates thermal shock issues associated with furnace components.

BRIEF DESCRIPTION OF THE DRAWINGS

The foregoing and other features and advantages provided by the present disclosure will be more fully understood from the following description of exemplary embodiments when read together with the accompanying drawings, in which:

FIG. 2B shows another exemplary embodiment of the containment cavity and various exemplary dimensions of the cavity.

FIGS. 5A and 5B show an exemplary embodiment of an apparatus having an automatic shutter. The shutter mechanism can be disposed on top of the base plate. The shutter plate can travel with the motion of the vessel contained within the containment cavity in such a way as to block any electromagnetic radiation when the vessel is in the loading position. The apparatus parts are labeled as follows: containment cavity within a housing 501 (vessel not shown); optical path 502; shutter shuttling plate 503 and base plate 504. In the position shown in FIG. 5A, the sample is loaded and the laser light is blocked. In the position shown in FIG. 5B, the laser light is incident in the vessel (and cavity), and the measurement can be taken.

FIGS. 9A-9C show different views of an exemplary embodiment of a sample beam adapted to hold a sample container.

DETAILED DESCRIPTION

Figure 1:
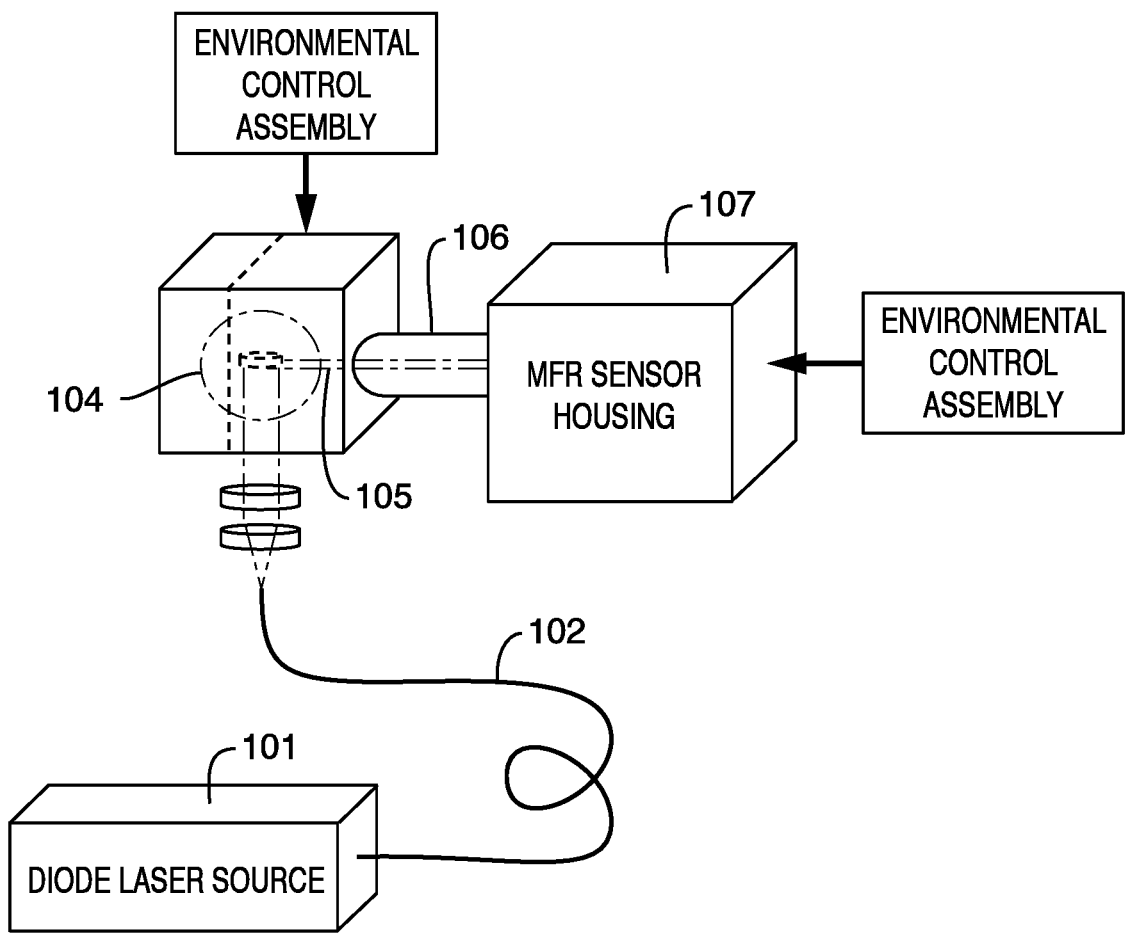
FIG. 1 shows an exemplary block diagram of the primary components of a direct thermal injection (DTI) thermal analysis apparatus. The electromagnetic radiation can be generated and delivered to a vessel located in a containment cavity and sample by a laser (e.g., a diode laser) 101, a fiber optic 102 and an optical coupler 103. The vessel contained in the cavity 104 can contain, at least, the sample and distal end of a sample beam 105 in the vessel and in the extender tube 106. The sensor (e.g., a magnetic force restoration (MFR) high precision weighing sensor) 107 can contain, and be connected to, the distal end of the sample beam. Both the vessel and the sensor can be contained in an environmental control assembly, either the same or separate assemblies.

The present disclosure relates generally to thermal analyses having direct application of thermal energy to a sample. Direct thermal injection uses electromagnetic or laser radiation directly impinging upon a sample or sample container in order to heat the sample for thermal analysis.

In one embodiment, the present disclosure relates to an apparatus for thermal analysis, including a balance, a vessel having a surface, wherein the surface is reflective, an electromagnetic radiation source capable of delivering electromagnetic radiation to the vessel, and a sample beam having a distal end and a proximal end, wherein the proximate end is connected to the balance and the distal end extends into the vessel, the distal end having a thermocouple and adapted to hold a sample.

The thermal analyses may include TGA, DSC, or combinations thereof. The apparatus of the present disclosure can be a thermogravimetric analyzer, a differential scanning calorimeter, or combinations thereof, such as a simultaneous DSC/TGA instrument.

The balance or sensor can be any balance or sensor used in thermal analyses capable of measuring a mass difference in response to a change in temperature or heating. The balance can include a magnetic force restoration high precision weighing sensor, high resolution strain gauge, or combinations thereof.

The containment cavity (or cavity) is the space within the containment cavity housing used to contain the vessel. The containment cavity can provide both environmental containment and control (e.g., gas, vacuum) of thermal analysis testing of a sample. The size and shape of the cavity can be any size or shape depending on the vessel size and shape, sample size, the heating requirements, the laser power, etc. In one embodiment, the cavity is substantially the same, or slightly larger, in size and shape as compared to the vessel. The size of the cavity can be estimated by the inner volume. The inner volume of the cavity can be about 0.1, 0.2, 0.5, 1, 2, 5, 10, 20, 50, 100, 200, 300, 400 or about 500 cc. These values can also be used to define a range, such as between about 0.1 cc and about 500 cc.

The vessel can be used to contain the sample(s), standard(s), or combinations thereof, the sample pan, platform and/or beam, as needed, and the electromagnetic radiation. The vessel can also provide both environmental containment and control (e.g., gas, vacuum) of thermal analysis testing of a sample. The size and shape of the vessel can be any size or shape depending on the cavity size and shape, sample size, the heating requirements, the laser power, etc. In one embodiment, the vessel is substantially the same, or slightly smaller, in size and shape as compared to the cavity. The size of the vessel can be estimated by the inner volume. The inner volume of the vessel can be about 0.1, 0.2, 0.5, 1, 2, 5, 10, 20, 50, 100, 200, 300, 400 or about 500 cc. These values can also be used to define a range, such as between about 0.1 cc and about 500 cc.

The vessel can have an internal and an external surface. The surface of the vessel can have one or more curved surfaces. The curved surfaces, when rendered reflective, can redirect or retroflect electromagnetic radiation in the vessel to the sample or sample pan, such as, for example, when the sample or sample pan is positioned at or near the center of the vessel. In one embodiment, the shape of the vessel is roughly spherical. In another embodiment, the shape of the vessel is substantially spherical. The shape of the vessel can also be roughly or substantially oval. For some vessels, such as spherical or oval vessels, the radius of the vessel can be about 1, 2, 3, 4, 5, 6, 7, 8, 9, 10, 15, 20, 25, 30, 35, 40, 45, 50, 55, 60, 65, 70, 75, 80, 85, 90, 95 or about 100 mm. These values can also be used to define a range, such as about 2 to about 100 mm.

The vessel can be made out of any material that has or can have its internal (inner) or external (outer) surface be reflective, or be coated to become reflective, and withstand temperatures ranging from about ambient to about 200, 250, 300, 350 or about 400° C. In some embodiments, the vessel surface does not reach as high a temperature as the sample or sample container. The electromagnetic radiation at the vessel surface is diffuse compared to at the sample or sample container. The vessel can be made of metal, quartz, glass or combinations thereof. In one embodiment, the vessel is made of quartz and the outer surface is coated with a reflective metal, e.g., a gold layer. In another embodiment, the vessel is made of quartz and the inner surface is coated with a reflective metal, e.g., a gold layer. In yet another embodiment, the vessel is made of quartz and both the outer and inner surfaces are coated with a reflective metal, e.g., a gold layer.

The cavity can have an inner surface. The inner surface of the cavity can be made out of any material that has or can have its internal (inner) surface be reflective, or be coated to become reflective. In a further embodiment, the inner surface of the cavity is made of metal and the inner surface of the metal is coated with a reflective metal, e.g., a gold layer, and the vessel is made of quartz that is uncoated.

The outer or inner surface of the vessel, and/or the inner surface of the cavity, can be reflective. These surfaces can be naturally reflective based on the reflective characteristics of the material. These surfaces can also be rendered reflective, or more reflective, by coating or depositing a layer of a reflective material on the respective surface(s). The coating or depositing of a layer of a reflective material on one or more of these surfaces can be performed by known coating or deposition methods, such as by chemical vapor deposition. In one embodiment, the vessel is made of quartz and externally coated one or more chemically vapor deposited (CVD) thin films. One advantage of externally coating the vessel, or coating the inner surface of the cavity, is the inner surface of the vessel can be cleaned without compromising the reflective coating (e.g., removing a fragile coating).

The reflective material on the one or more surfaces, whether part of the vessel or cavity, coated or deposited, can include metals or chemically vapor deposited coatings, including thin films, metals such as gold, aluminum, silver, chromium, magnesium, or combinations or alloys thereof. For coated or deposited materials, the thickness of the layer can be about 0.5, 1, 5, 10, 50, 100, 500, 1000, 5000 or 10000 nm. These values can also be used to define a range, such as about 1 to about 10000 nm.

The reflective surfaces of the vessel or cavity can serve as a retro-reflector of laser radiation and of spontaneously emitted infrared radiation from the sample and sample pan. The surfaces can be highly reflective to both the incident laser wavelength and broadband IR wavelengths. The reflective surfaces can have a light reflectance as measured by standard techniques of about, or greater than, 50, 55, 60, 65, 70, 75, 80, 85, 90, 95, 98, 99 or 100% in the wavelength range of 300 nm to 10,000 nm. The inner or external surface of the vessel, or inner surface of the cavity, can have a light reflectance as measured by standard techniques of about, or greater than, 50, 55, 60, 65, 70, 75, 80, 85, 90, 95, 98, 99 or 100% in the wavelength range 300 nm to 10,000 nm or broadband infra-red "blackbody emission."

The vessel can have an opening capable of passing electromagnetic radiation into the vessel. The opening can be a physical opening in the vessel wall. The opening can be a section of the vessel that is transparent to the radiation. In one embodiment, the vessel is made from quartz and has an internal or external surface coated with gold. The opening is a small section of the vessel that does not have the internal surface coated with gold. This opening is transparent to the radiation, whereas the remaining gold coated inner surface is not.

The size of the opening can be small. The electromagnetic radiation entering the vessel can have a focal point at or near the vessel wall. The size of the opening can be about 0.0001, 0.005, 0.01, 0.05, 0.1, 0.2 or about 0.25 inches. These values can also be used to define a range, such as about 0.0001 to about 0.25 inches. Similarly, the cavity can have an opening capable of passing electromagnetic radiation into the cavity, and then into the vessel. The cavity opening can be a similar sized physical or transparent opening as the vessel opening.

The vessel can also be replaced in a simple and convenient manner as a replacement part. The apparatus includes the ability to readily and easily replace an existing internal reflective vessel with another vessel. One common issue is the solidification or condensation of sample degradants and materials on the inner surface of the vessel. After repeated thermal analyses using the same vessel, the vessel can become contaminated, less efficient, the internal surface less reflective, or combinations thereof. In one embodiment, the vessel can be removed and replaced by manipulating a few simple fasteners and achieved in less than five minutes for a competent user.

The electromagnetic radiation source can be any source capable of delivering sufficient light energy to the vessel and sample/sample pan to allow for thermal analysis. The source can be a laser (e.g., a diode laser), a high intensity gas discharge bulb, a halogen cycle filament bulbs, arc lamp, or combinations thereof. The source can deliver radiation as predominately one wavelength (e.g., laser) or over a broad distribution of wavelengths (bulb). In one embodiment, the range of wavelengths that can be generated and delivered by the source is about 200, 300, 400, 500, 600, 700, 800, 9000, 1000, 1100, 1200, 1300, 1400, 1500, 1600, 1700, 1800, 1900, 2000, 2100, 2200, 2300, 2400, 2500, 3000, 4000, 5000, 6000, 7000, 8000, 9000 and 10000 nm. These values can also be used to define a range, such as about 250 to about 1100 nm. In one embodiment, a diode laser with a peak wavelength of about 808 nm is used to deliver a predominantly single wavelength radiation. The diode laser can provide radiation over a long period of time with a controllable power output.

In one embodiment, the containment cavity or vessel need not be heated. The fundamental principal of direct thermal injection differs from that of the current state of the art of furnaces. Application of this heating method permits very high temperatures to be achieved within a very short period of time, using dramatically less energy as compared to the current state of the art. The amount of power used and/or delivered by the source can perform the thermal analysis is relatively small. Traditional thermal analysis instruments requires 1000+W of power to perform a single thermal analysis. The apparatus of the present disclosure requires about, or less than, about 1000, 900, 800, 700, 600, 500, 400, 300, 250, 200, 150, 100, 75, 50 or about 25 W of power to perform a single analysis at elevated temperatures, such as about 1,700° C., or near the maximum temperature of the apparatus. These values can also be used to define a range, such as about 200 to about 25 W.

The apparatus can also achieve high operating temperatures. The maximum operating temperature of the apparatus can be about 1700, 1650, 1600, 1550, 1500, 1450, 1400, 1350, 1300, 1250, 1200 or about 1150° C., depending on the electromagnetic radiation source, cavity or vessel shape, cavity or vessel dimensions, surface reflectivity of the vessel of cavity inner surface, and other design characteristics. The overall temperature range of the apparatus can vary from the high operating temperatures down to ambient and sub-ambient temperatures. Sub-ambient temperatures can be achieved using a Peltier device or a thermoelectric cooler in contact, or in thermal communication, with the containment cavity. These values can also be used to define a range, such as about sub-ambient to about 1700° C.

The apparatus can also have high temperature control precision and ramp rates. The ramp rate of the apparatus of the present disclosure can be 0.1, 0.5, 1, 5, 10, 50, 100, 500, 1000, 5000, 10000 or about 20000° C./min. These values can also be used to define a range such as between about 0.1° C./min to about 20000° C./min. Similarly, the apparatus can have short cooling time and, therefore short duty cycles. The cooling time of the apparatus of the present disclosure from a high temperature, such as over 1000° C. (e.g., 1200° C. or 1700° C.) can be, or less than, about 30, 45, 60, 90, 120, 150, 180, 210 or about 240 seconds. These values can also be used to define a range such as about 30 to about 120 seconds.

The fast heating and cooling rates of the apparatus facilitates enhanced throughput, when compared to traditional furnace technologies. The duty cycle (e.g., heating a sample from room temperature to a high temperature, such as over 1000° C. (e.g., 1200° C. or 1700° C.), and cooling the sample back to room temperature) can be, or less than about 10, 9, 8, 7, 6, 5, 4, 3 or about 2 minutes. These values can also be used to define a range, such as about 5 to about 2 minutes. In one embodiment, the apparatus of the present disclosure can heat a sample to over about 1,200° C. in roughly than one minute using less than about 50 W of power.

The electromagnetic radiation source can be in electromagnetic radiation communication with the vessel via an optical fiber, an optical wave guide, a lens and mirror assembly, or combinations thereof. The electromagnetic radiation can be delivered to the vessel by standard fiber optics and an optical coupler. The optic coupler can communicate the electromagnetic radiation from the radiation source to the vessel through an opening or transparent window.

Figure 3:
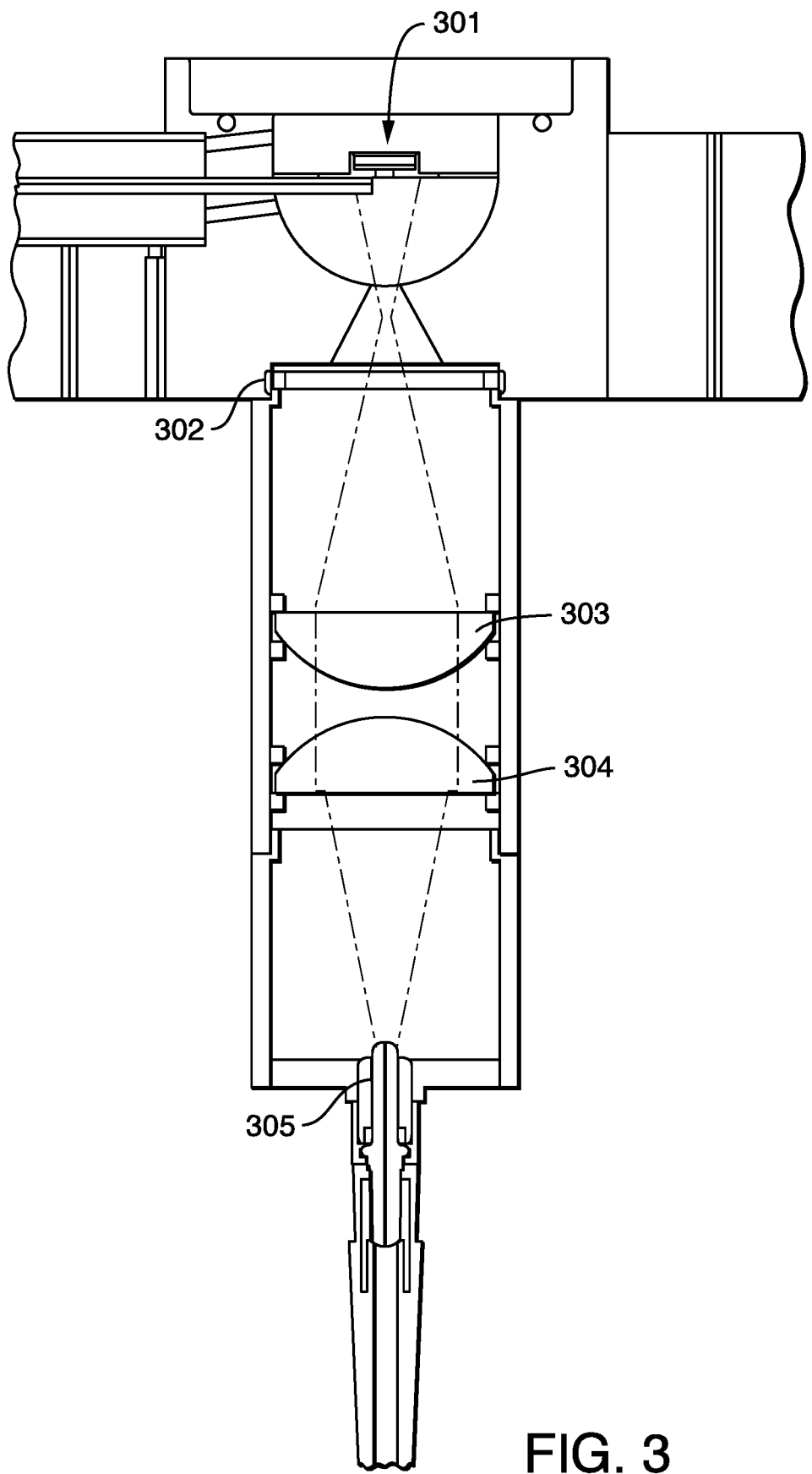
FIG. 3 shows an exemplary embodiment of a containment cavity with an optical coupler assembly. The parts are labeled as follows: sample platform 301 at focus of spherical reflectors; laser containment tube interface 302 to the DTI cavity; focusing lens 303 in the optical coupler; collimating lens 304 in the optical coupler; fiber optic connector 305 to the containment tube housing the optical coupler.
Figure 4:
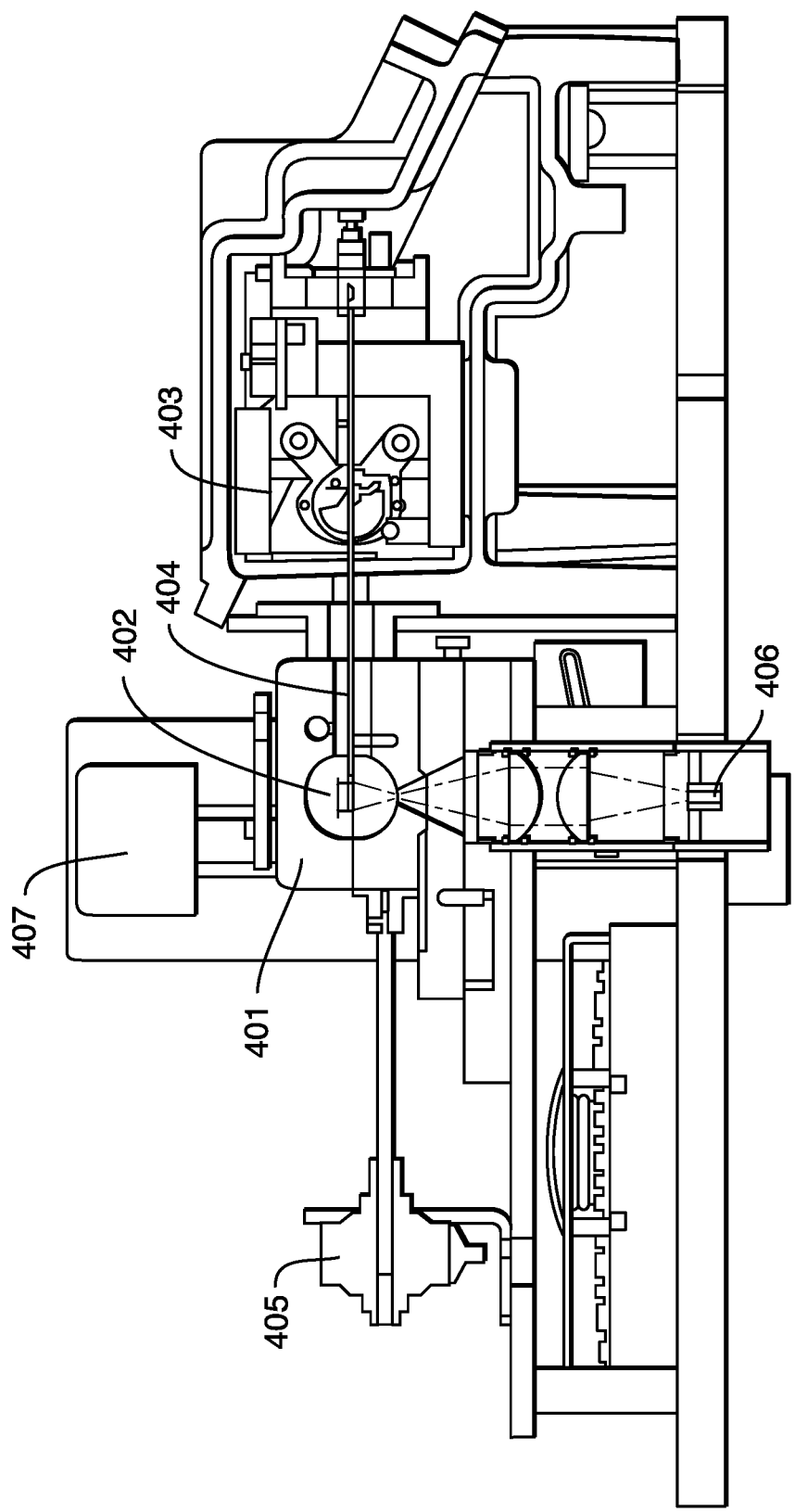
FIG. 4 shows an exemplary embodiment of an apparatus having direct thermal injection. The apparatus parts are labeled as follows: containment cavity 401 within a housing (vessel not shown); sample pan 402; MFR weighing instrument 403; sample arm 404 (high temperature material); actuator motor 405; optical fiber attachment point 406 (or other radiating energy source); automatic loading mechanism 407 with loading arm.
Figure 6A:
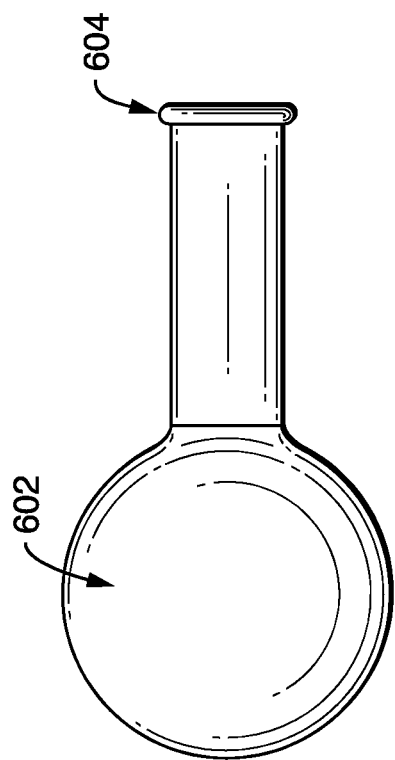
FIGS. 6A-6C show an exemplary embodiment of a vessel with an integral extender tube 601. The vessel can be gold plated quartz 602, as shown in FIG. 6B. The gold plating can be coated on the external surface of the vessel, the internal surface of the vessel or combinations thereof. The gold plating provides a highly reflective surface for the incident light. A portion 603 of the clear quartz can be unplated, as shown in FIGS. 6A and 6C, to allow for electromagnetic radiation from the optical coupler to enter the vessel. The extender tube can have a high temperature seal 604 (e.g., rubber seal) to seal against the balance or sensor housing.
Figure 6B:
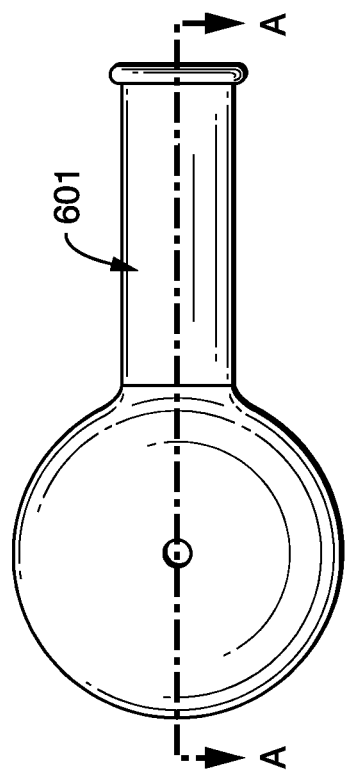
Figure 6C:
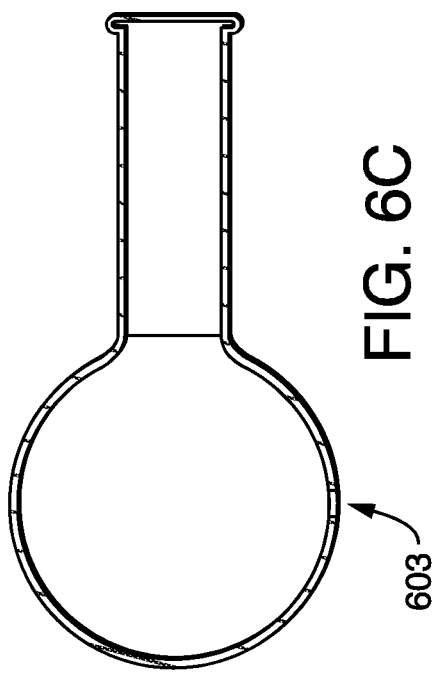
Figure 7A:
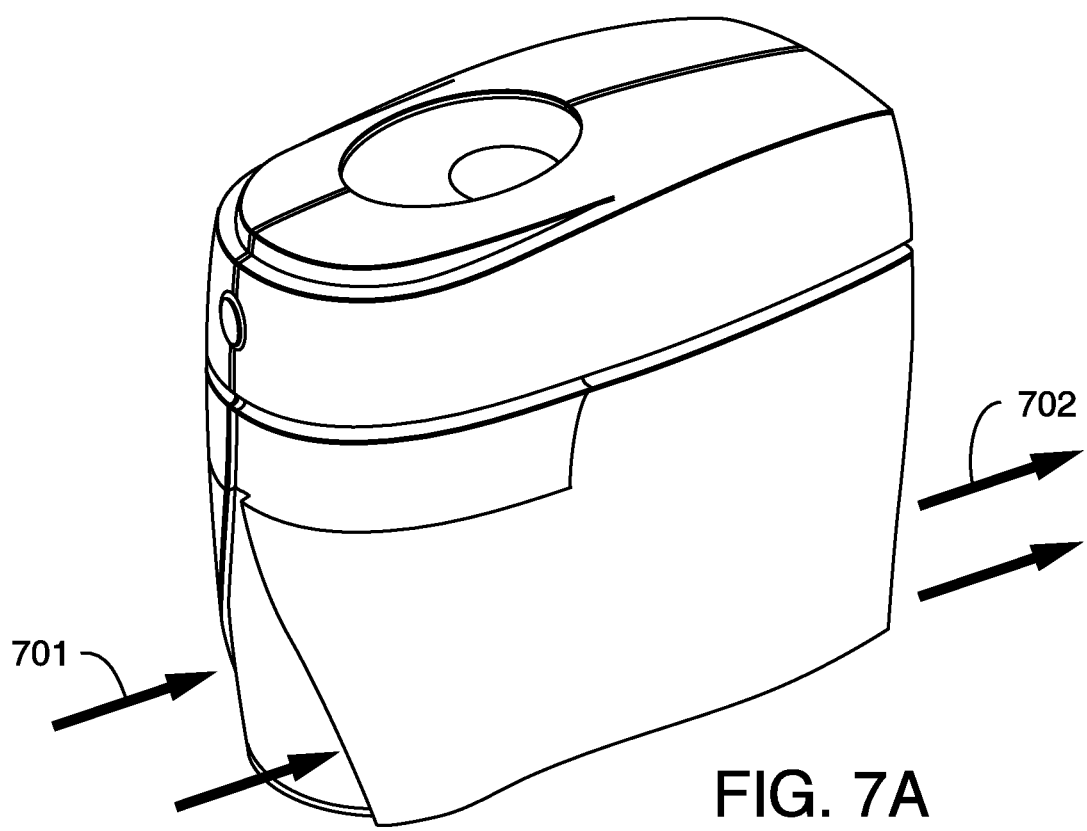
FIG. 7A and FIG. 7B show an exemplary embodiment of a thermal analysis instrument having direct thermal injection. The instrument assembly can contain air intake 701 and exhaust openings 702 to keep the electromagnetic radiation (e.g., laser) and other components cool. The instrument can also contain an optional auto-sampler assembly 703.
Figure 7B:
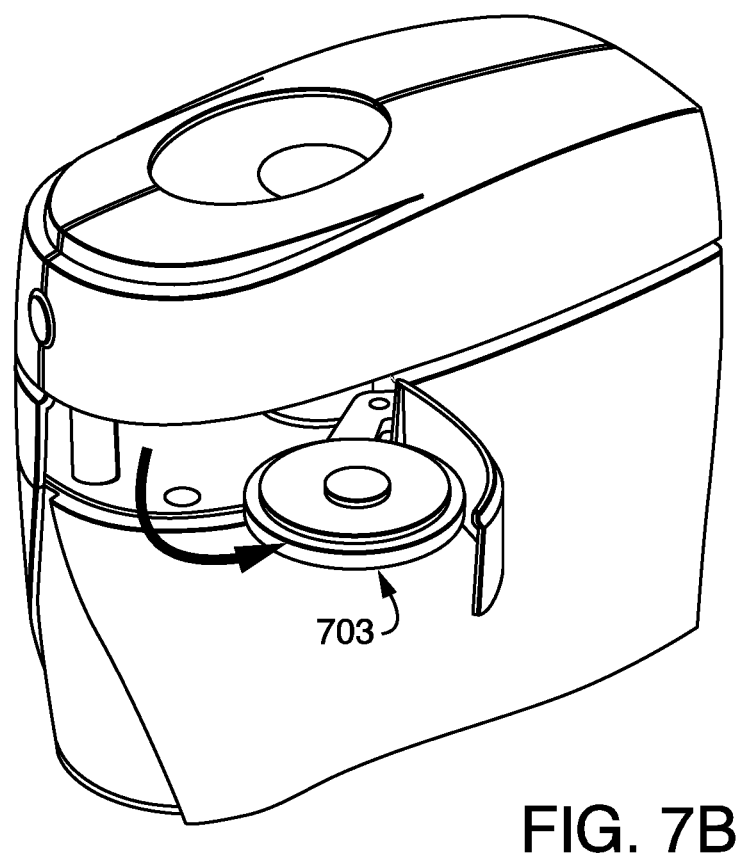
Figure 8A:
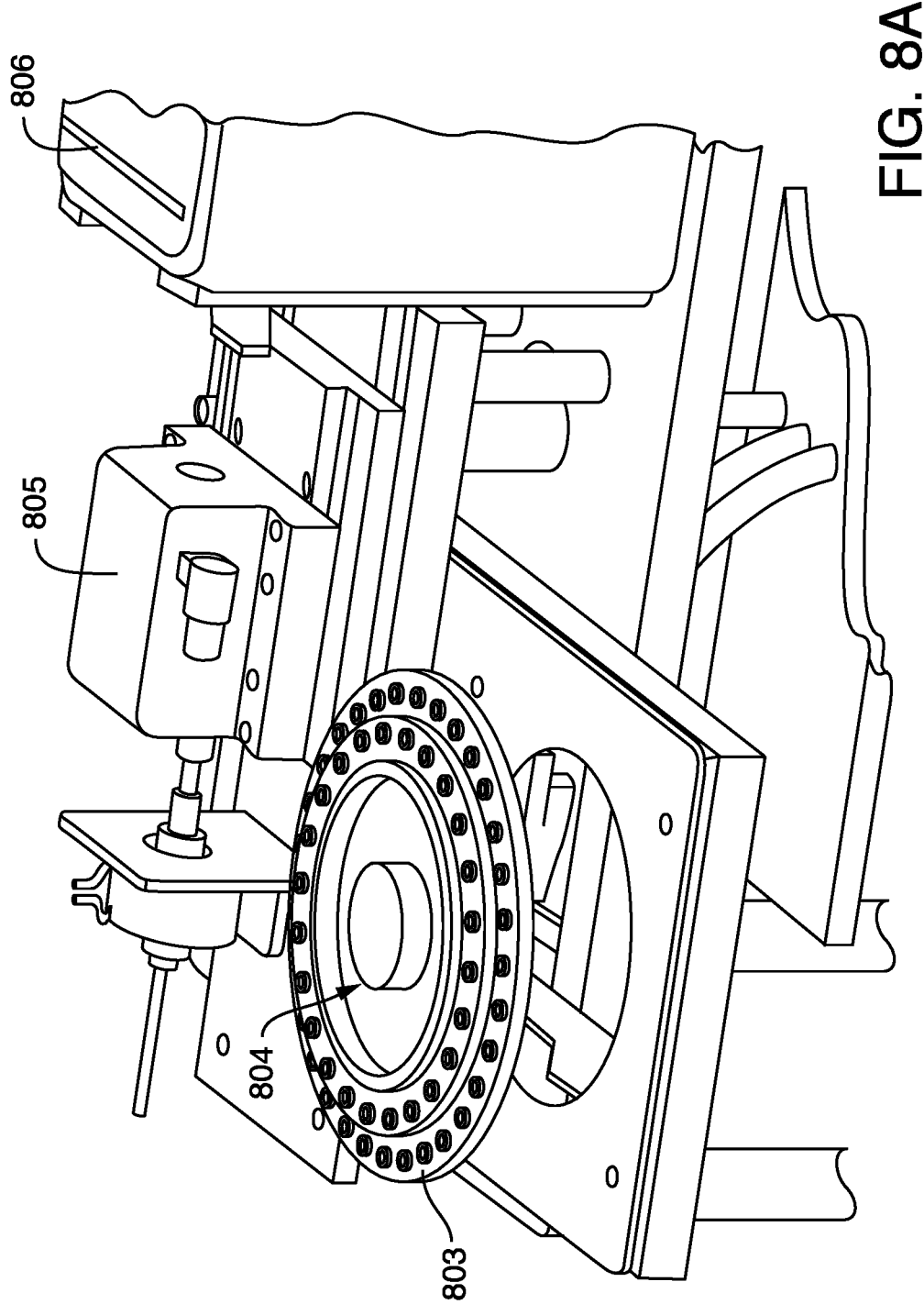
FIGS. 8A and 8B show an exemplary embodiment of the auto-sampler, or automatic sample loader, for high measurement throughput. The auto-sampler loading arm 801 or mechanism can be rotated around an axis 802. The auto-sampler (A/S) can have a park position, a position to select a sample pan 803 from a tray 804 based on priority or pan position and a vessel position to place and retrieve sample pans from the vessel. The apparatus can have an integrated auto-sampler capable of retrieving a sample pan from the sample beam, and placing it underneath/adjacent to the vessel into a coliseum-style auto-sampler tray. Additional apparatus parts are labeled as following: cavity mounting 805 and balance housing 806.
Figure 8B:
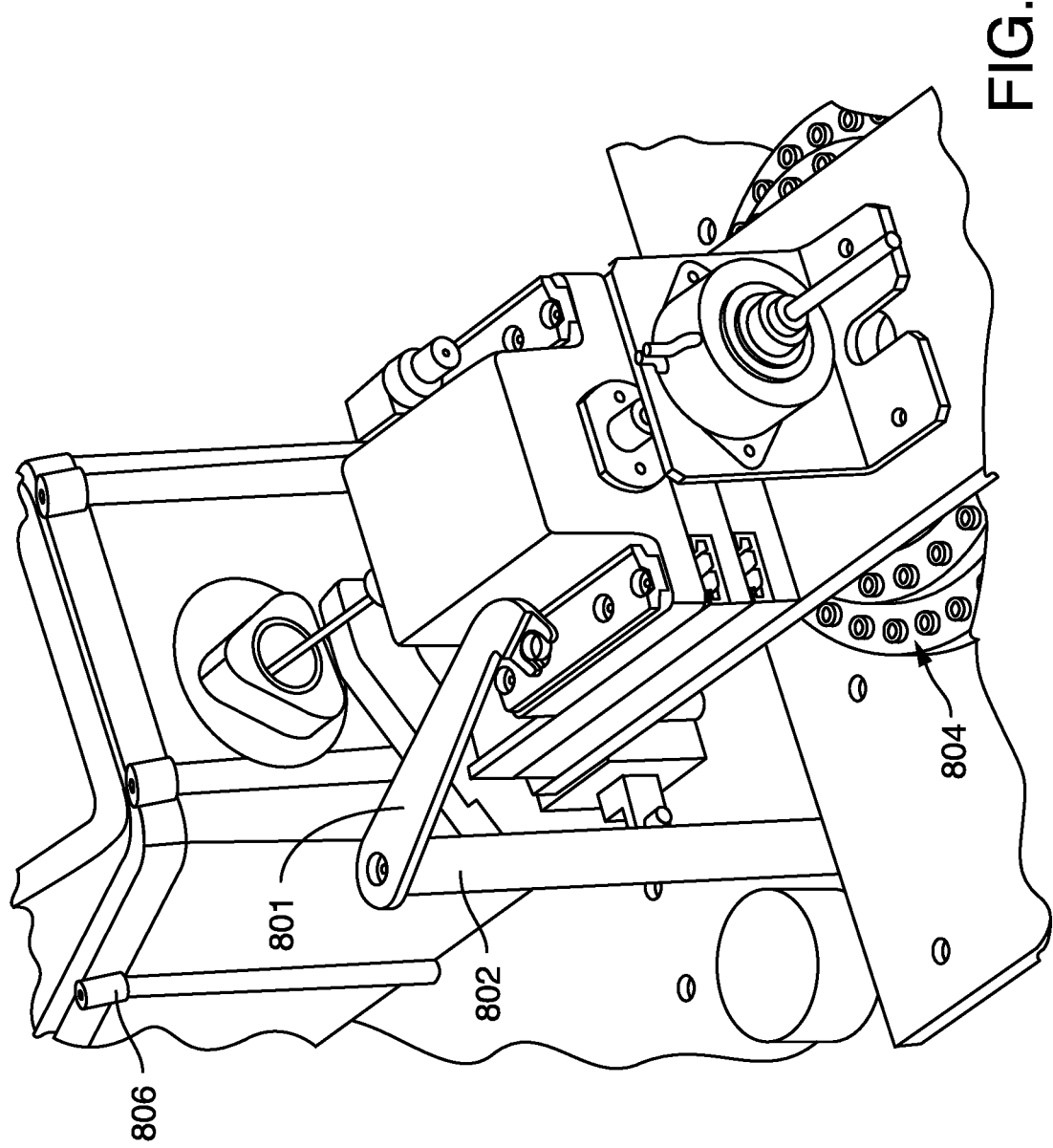

FIG. 3 shows an exemplary embodiment of a containment cavity (vessel not shown) with an optical coupler assembly. A fiber optic containing the electromagnetic radiation (e.g., laser light) can be connected to an optical coupler to collimate and subsequently focus the light through a small opening in the containment cavity and onto the sample or sample pan. The opening can be a physical opening or can be a transparent window. The diverging electromagnetic radiation entering the cavity can be primarily incident on the sample or sample pan bottom (i.e., the area of the entering diverging beam is the same or smaller than the sample or sample pan upon which it is incident), partially diverged such that a significant portion of the entering radiation is both incident on the sample or sample pan bottom and incident on the sides and top of the cavity to be retroflected onto the top of the sample or sample pan (i.e., the area of the entering diverging beam is slighter larger than the sample or sample pan upon which it is incident), or significantly diverged such that the majority of the entering radiation is incident on the walls or top of the cavity before being retroflected to the sample or sample pan (i.e., the area of the entering diverging beam is about 2× or more larger than the sample or sample pan upon which it is incident).

The sample beam (or arm) can be any beam (or arm) capable for extending from the sensor into the vessel and effectuating a thermal analysis measurement. The sample beam can have a proximate end attached to the balance or sensor, and a distal end that extends into the vessel. The sample beam can be made of any material capable of functioning at high temperatures, such as high temperature ceramic material, sapphire, or combinations thereof.

The distal end of the sample beam can contain one or more thermocouples capable of operating without premature degradation at the maximum operating temperature of the apparatus. The distal end of the sample beam can also be adapted to hold a sample or a sample container. The distal end can be formed as a ring wherein a sample container is placed, formed as a platform (or pan) wherein a sample or sample container is set. FIGS. 9A-9C show different views of an exemplary embodiment of a sample beam 901 having a ring 902 at the distal end.

The design and heating of the apparatus focuses the heat energy on the sample or sample container as opposed to broadly or grossly heating the entire cavity or vessel. As such, the length of the sample beam exposed to high temperatures is reduced compared to traditional thermal analysis instrument. The sample beam used in the apparatus of the present disclosure experiences a significant reduction, or elimination, of beam growth, such as from thermal expansion, for horizontally oriented sample beams. As such, the length of the sample beam can also be shorter allowing for the balance or sensor to have a greater dynamic range. The sample or standard size can be about 0.0001, 0.0005, 0.001, 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 and 1 gram. These values can also be used to define a range, such as about 0.1 mg to about 1 gram.

The sample beam can be adapted to hold a sample or sample pan at the distal end. The sample pan can have a radius of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 and 1 inches. These values can also be used to define a range, such as about 0.05 to about 0.5 inches. The sample pan can have an open top or a lid, or closed top. The lid or closed top portion of the sample pan can be made of the same material of the sample pan, or can be made of different material. The method and apparatus of the present disclosure are applicable to any sample or standard subject to thermal analyses.

The sample beam can be contained or enclosed within an extender tube. The extender tube can be attached to either the balance or the vessel. The extender tube can be an integral part of the vessel. The extender tube can be considered the "neck" of the vessel and can provide a physical interface between vessel and balance housing. The physical interface can be the formation of a gas tight seal.

The vessel and extender tube can be designed to move laterally away from the balance or sensor, in the direction of the sample beam, to expose the distal end of the sample beam. The lateral movement can allow for sample loading and removal. To inhibit the electromagnetic radiation from escaping the apparatus when the vessel is moved, the apparatus can also have a shutter mechanism. The shutter allows for the safe movement of the containment cavity and vessel, and automatically blocks and accidental laser radiation from escaping the instrument.

The shutter can be an integrated member of the vessel or cavity housing. In one embodiment, the vessel or cavity housing is moveable along a longitudinal axis of the sample beam from a first position where the distal end of the sample beam is located in the center of the vessel to a second position where the distal end of the sample beam is outside the vessel and/or extender tube. In another embodiment, the apparatus comprises a shutter, or shutter plate, located between the vessel or cavity opening and an electromagnetic radiation source, the shutter or shutter plate having an opening to allow passage of the electromagnetic radiation into the vessel when the vessel is located such that the distal end of the sample beam is located in the center of the vessel.

In one embodiment, the present disclosure relates to a thermogravimetric analyzer instrument with direct application of the thermal energy to a sample or a sample pan. The instrument includes a laser energy source, a containment cavity, a vessel, an optical coupler, a sample pan, a sample weighing arm (or beam), a MFR high precision weighing sensor, and an open/close mechanism with sample loading functionality. The weighing arm extends horizontally from the sensor to the vessel. The arm is made using a high temperature ceramic material and includes thermocouple in contact with a sample pan at the distal end of the arm. The arm couples the sample to the MFR sensor for purposes of sample weight determination. The sample pan is positioned in relation to the optics such that it receives an optimally and evenly distributed amount of laser energy. The focal crossover point of the laser beam is disposed to coincide with a small opening/window of the containment cavity, vessel or both.

The present disclosure also relates to a method of heating a sample in an apparatus for thermal analysis including irradiating the sample with electromagnetic radiation and measuring a thermal property of the irradiated sample. The method can include direct irradiation of the sample or sample container with electromagnetic radiation and bypassing the need for environmental heating. It can also include optimizing the shape and/or distribution of the radiation (e.g., optical beam) to provide an isotropic thermal gradient, or to minimize thermal gradients in the sample.

The apparatus can be designed to enable minimization of thermal gradients within the sample. In one embodiment, thermal gradients can be minimized by irradiating the sample from multiple directions at the same time. For example, an optical coupler can be placed on both the top and bottom of the vessel and electromagnetic radiation can be provided via fiber optics or other wave guide technologies. The incident electromagnetic radiation can then be direct to both the top and bottom of the sample or sample container. In other embodiments, the incident electromagnetic radiation can then be direct to the sample or sample container from multiple directions using multiple entrance points of incident radiation into the vessel. The apparatus can also be designed to enable maximization of thermal gradients in the vessel. For example, the sample or sample pan may be at a temperature of about 1,500° C. while the vessel walls are at a temperature of about 300° C. In some embodiments, the thermal gradient within the vessel can be, or greater than, about 10, 50, 100, 200, 300, 400, 500, 600, 700, 800, 900 or about 1000° C. These values can be used to define a range of about 50 to about 500° C.

In another embodiment, the optical geometry of a single incident source can be designed to minimize thermal gradients in the sample. The cavity, vessel, optical coupler or combinations thereof can be designed to retroflect a portion of the incident radiation off the sides or opposite surface of the cavity or vessel to irradiate all sides of the sample or sample container. For example, the laser light can pass through an opening in a transparent window on the bottom of the vessel. A portion of the light bypasses the sample or sample container and is retroflected from the top of the reflective vessel and onto the top of the sample or sample container. The sample or sample container is, thereby, uniformly illuminated reducing and minimizing thermal gradients.

In another embodiment, the present disclosure relates to a method of conducting thermogravimetric analysis, including providing an instrument for thermal analysis having direct thermal injection as described above, depositing a sample at the distal end of the sample beam, heating the sample using electromagnetic radiation, and determining a change in mass of the sample and/or standard in response to the heating. The method can also include cooling, or allowing the apparatus to cool and repeating the analysis on another sample.

The apparatus of the present disclosure can be designed to perform one or more thermal analyses with little to no modifications. For example, a thermogravimetric analyzer using direct thermal injection can be modified to perform DSC by changing only a few components, such as the vessel, the beam, the optical coupler, the connection of the beam to the balance, or combinations thereof. The majority of the apparatus, e.g., electronics, power supplies, auto-sampler, laser, cooling, etc. can remain the same. In one embodiment, a TGA instrument can be readily changed to a DSC instrument. The TGA vessel, optical coupler and sample beam can be replaced with a DSC vessel, optical coupler and sample beam. The original TGA optics and sample platform were matched and both circular. The circular illumination enables optimum illumination of the bottom of the platform for TGA. They were replaced with DSC optics and sample platform that are matched and both oval. The matching oval illumination and sample platform enable optimal oval illumination of that DSC platform and optimal heat distribution.

In comparison to commercially available thermal analysis instruments, the apparatus of the present disclosure using direct thermal injection provides numerous advantages. See Table 1 below. In addition, the footprint of the apparatus of the present disclosure is about 8"W×18"D×16"H, or about a 70% reduction in footprint and about a 80% reduction of overall instrument size.

TABLE 1

Comparison of DTI-TA with similar commercial TGA instruments.

| | Furnace | Max. Temp | Max. Ramp Rate | Cooling Time (Max. Temp to 50° C.) |
|---|---|---|---|---|
| DTI-TA | DTI | 1700° C. | 30000° C./min | ~1 min |
| Discovery TGA | Halogen Bulbs | 1200° C. | 2000° C./min | ~10 min |
| PerkinElmer's TGA8000 | Miniaturized platinum-wire wound furnace | 1200° C. | 500° C./min | ~10 min |
| Netzsch's TG 209 F3 Tarsus | Traditional wire wound furnace | 1000° C. | 100° C./min | ~25 min |
| Mettler's TGA 2 (SF) | Traditional wire wound furnace | 1100° C. | 250° C./min | ~10 min |

The disclosures of all cited references including publications, patents, and patent applications are expressly incorporated herein by reference in their entirety.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The present invention is further defined in the following Examples. It should be understood that these Examples, while indicating preferred embodiments of the invention, are given by way of illustration only.

EXAMPLES

Example 1—Thermogravimetric Analyzer Having Direct Thermal Injection

Figure 2A:
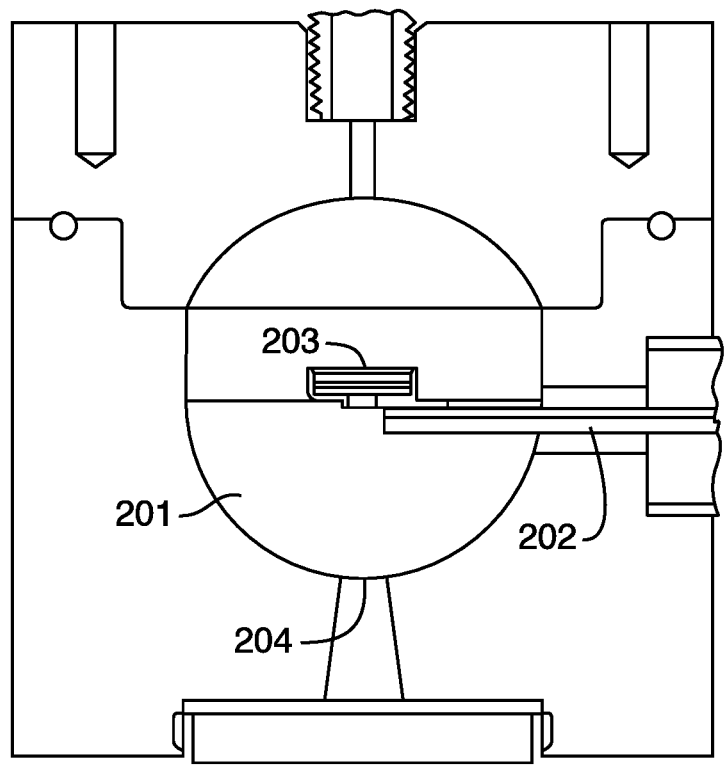
FIGS. 2A and 2B show exemplary embodiments of a containment cavity fashioned from a machined block of metal. The apparatus parts are labeled as follows: containment cavity 201; sample beam 202; sample pan 203; cavity opening 204 for electromagnetic radiation to enter. The vessel contained within the cavity is not shown. The cross-sectional view of FIG. 2A shows the relative orientation of the sample beam entering the cavity from the side and the incident laser beam entering the cavity from below.
Figure 2B:
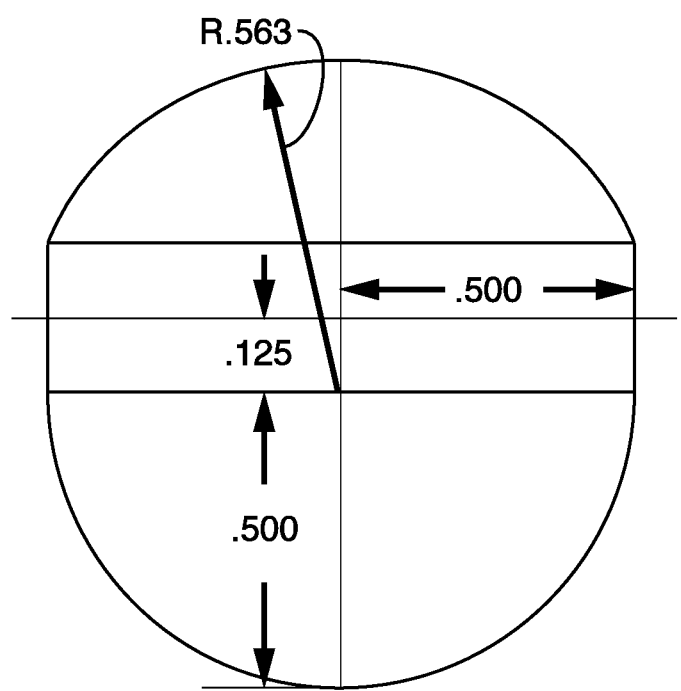

The instrument employed a balance and a portion of electronics from a TA Instruments' Q600 (SDT). The components were mated to an off-the-shelf diode laser system (DILAS MINI 808 nm) custom designed cavity, and off-the-shelf control electronics. The instrument was fitted with a containment cavity made of brass. The dimensions of the cavity are similar to those shown and described in FIG. 2B. The upper radius was 0.5625 inches. The lower radius was 0.5 inches. The cavity included a cylindrical section had a height of about 0.25 inches and a radius of about 0.5 inches. The interior surface of the cavity was coated with gold to provide a reflective surface.

The diode laser generated the electromagnetic radiation as a wavelength of 808 nm. The power of the laser to heat the sample was about 50 W. The laser was fitted with a fiber optic (DILAS, MINI, 400 um core, 2 m length fiber) to transmit the light from the laser to the optical coupler. An optic coupler was used to couple the light from the fiber optic to the vessel.

Because the sample pan is heated directly and the power usage is low, the apparatus did not include any water cooling of the cavity (e.g., a water cooled heat exchanger). The apparatus also did not include a "thermal break" between the cavity and the MFR weight sensor. One on the advantages of the apparatus is the elimination of refractory insulation and/or water cooled jackets.

A calcium oxalate (CaOX) standard is tested by thermogravimetric analyzer having direct thermal injection and a commercially available TGA (Discovery TGA IR furnace or PerkinElmer's TGA8000). The TA-TDI has a much faster cooling rate (i.e., about 45 seconds compared to about 8 minutes.

What is claimed is:

1. An apparatus for thermal analysis, comprising:
   (i) a balance;
   (ii) a vessel having an internal and an external surface, wherein the internal surface is reflective, wherein the vessel further includes an electromagnetic radiation transparent opening for passing electromagnetic radiation into the reflective vessel;
   (iii) an electromagnetic radiation source capable of delivery electromagnetic radiation to the vessel; and
   (iv) a sample beam having a distal end and a proximal end, wherein the proximal end is connected to the balance and the distal end extends into the vessel, the distal end having a thermocouple and adapted to hold a sample.

2. The apparatus of claim 1, wherein the apparatus is a thermogravimetric analyzer or a differential scanning calorimeter.

3. The apparatus of claim 1, further comprising an extender tube attached to either the balance or the vessel, wherein the extender tube encloses the sample beam.

4. The apparatus of claim 3, wherein the extender tube is an integral part of the vessel.

5. The apparatus of claim 1, wherein the reflective surface of the vessel reflects more than 80% of the incident electromagnetic radiation having a wavelength from 600 nm to 20000 nm.

6. The apparatus of claim 1, further comprising an optical coupler in electromagnetic radiation communication with the vessel opening.

7. The apparatus of claim 1, further comprising an electromagnetic radiation source in electromagnetic radiation communication with the vessel.

8. The apparatus of claim 1, wherein the vessel is moveable along a longitudinal axis of the sample beam from a first position where the distal end of the sample beam is located in the center of the vessel to a second position where the distal end of the sample beam is outside the vessel and/or extender tube.

9. The apparatus of claim 1, further comprising a shutter plate located between the vessel opening and an electromagnetic radiation source, the shutter plate having an opening to allow passage of the electromagnetic radiation into the vessel when the vessel is located such that the distal end of the sample beam is located in the center of the vessel.

10. The apparatus of claim 1, wherein the maximum operating temperature of the apparatus is 1700° C.

11. The apparatus of claim 1 having a duty cycle of less than 5 minutes.

12. The apparatus of claim 1, further comprising a Peltier device capable for providing sub-ambient operating temperatures.

13. The apparatus of claim 1, wherein the minimum operating temperature of the apparatus is −20° C.

14. The apparatus of claim 1, wherein the distal end of the sample beam comprises a sample pan.

15. A method of conducting thermogravimetric analysis, comprising
   (i) providing an apparatus of claim 1;
   (ii) depositing a sample at the distal end of the sample beam;
   (iii) heating the sample using electromagnetic radiation; and
   (iv) determining a change in mass of the sample in response to the heating.

* * * * *